A. L. GUSEY.
AERIAL VESSEL.
APPLICATION FILED JUNE 12, 1917.
1,241,623.
Patented Oct. 2, 1917.
10 SHEETS—SHEET 6.
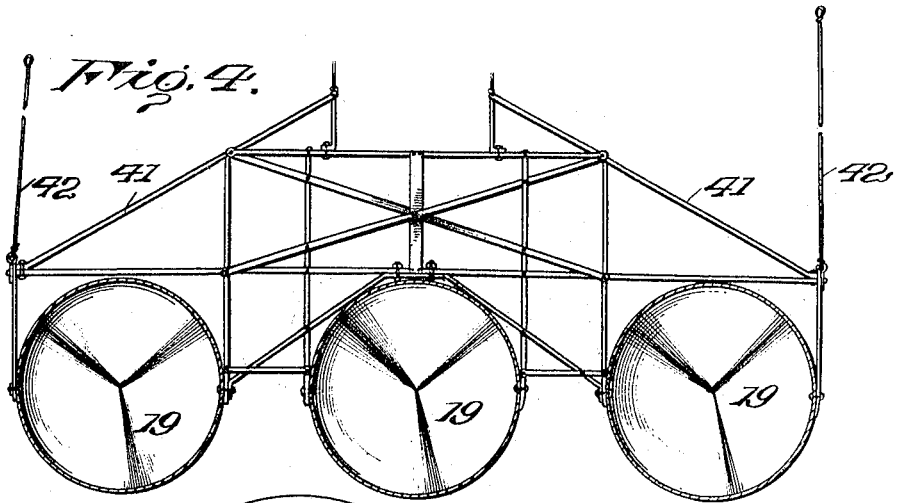
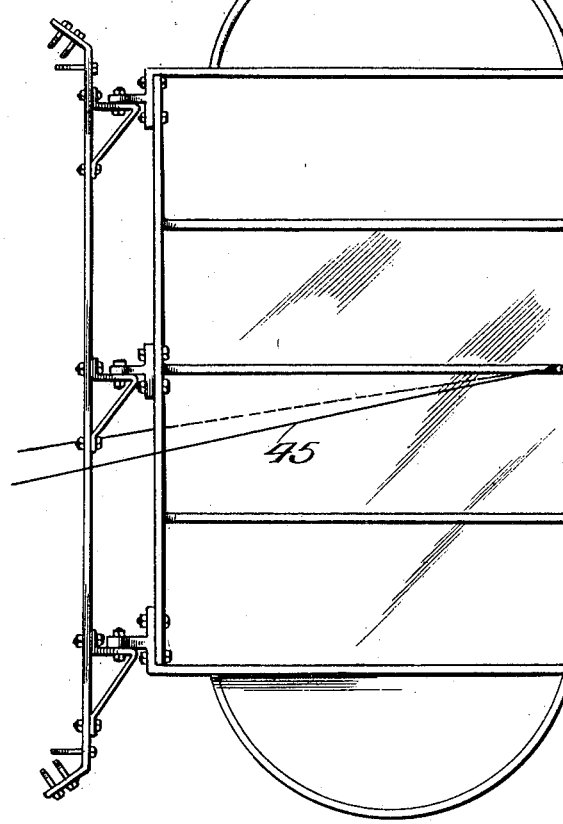
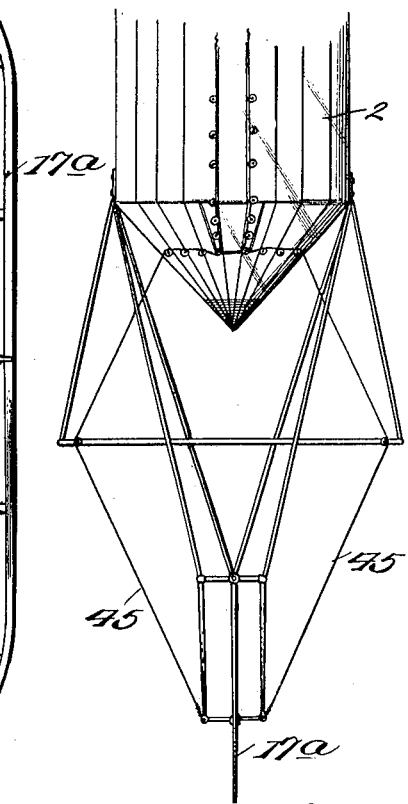
Inventor
Arthur L. Gusey.
By Max A. Schmidt
Attorney A. L. GUSEY.
AERIAL VESSEL.
APPLICATION FILED JUNE 12, 1917.
1,241,623.
Patented Oct. 2, 1917.
10 SHEETS—SHEET 7.
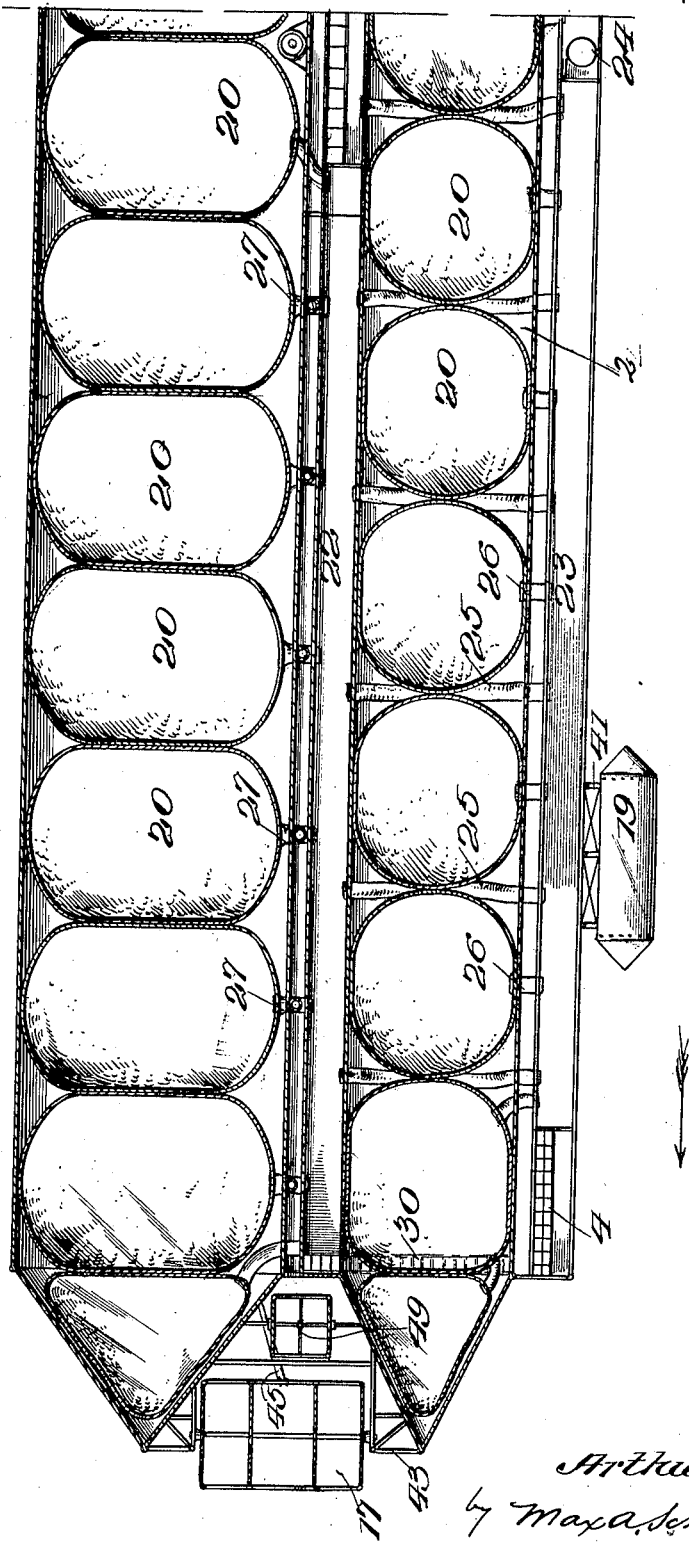

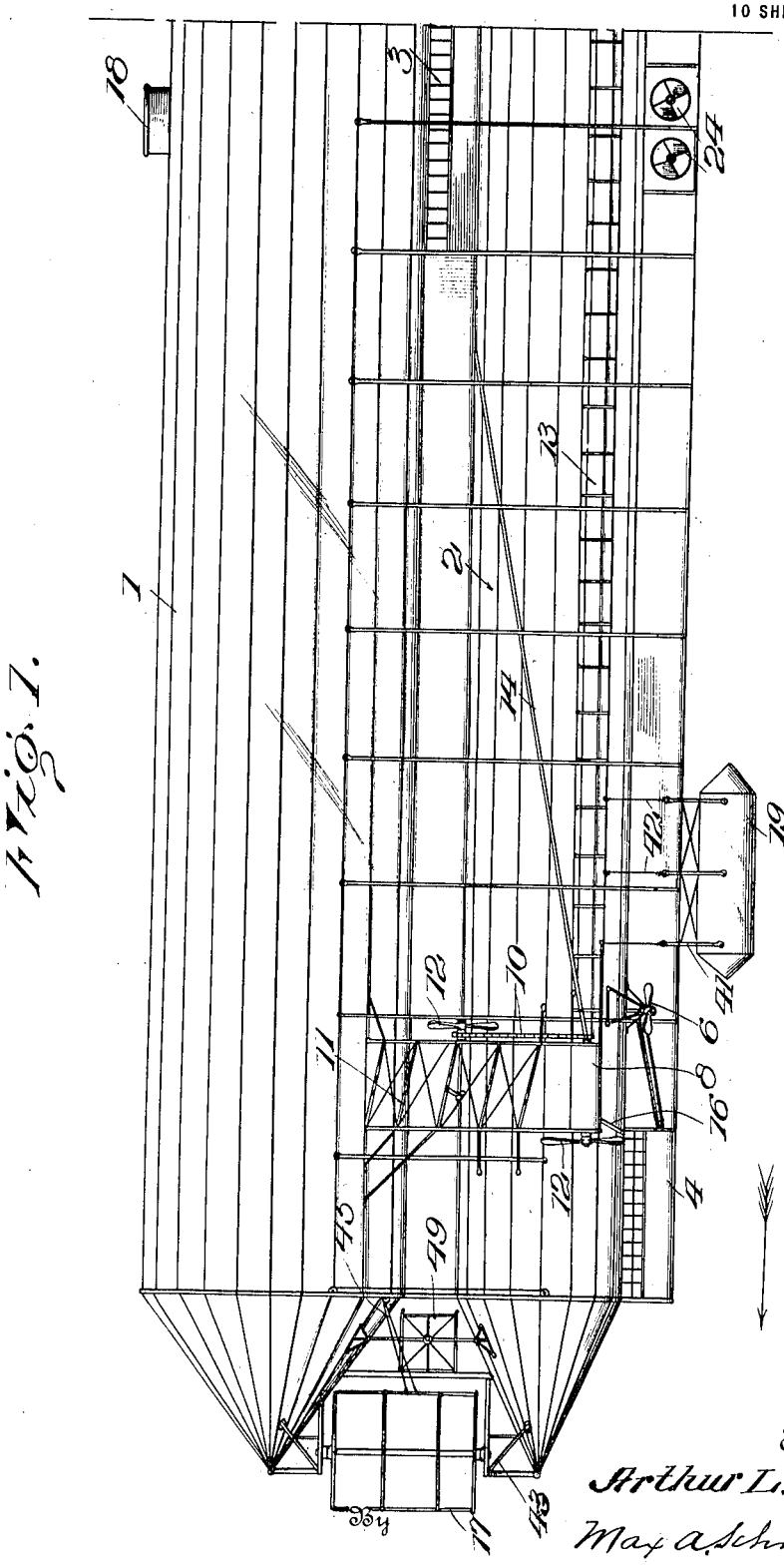

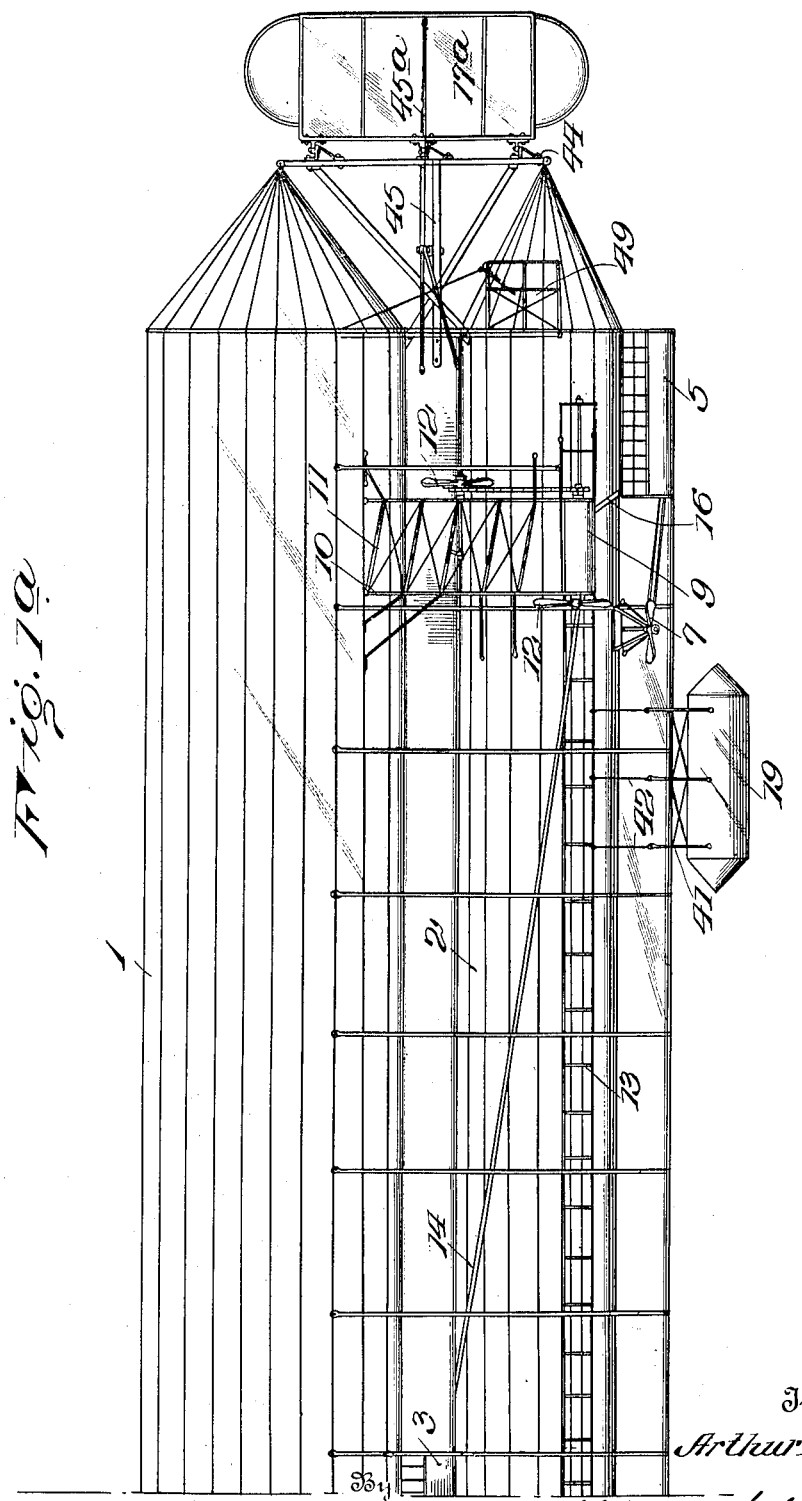

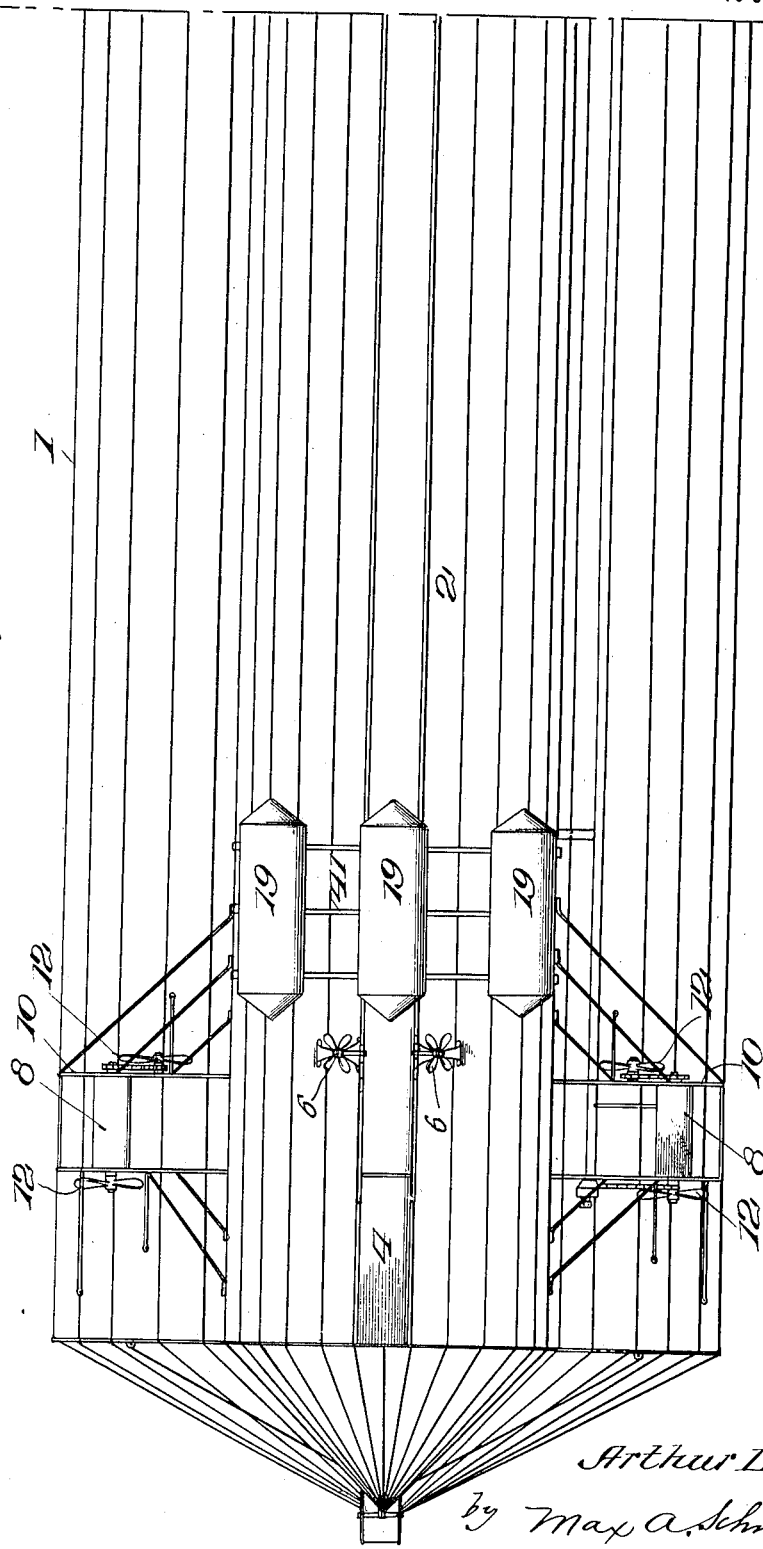

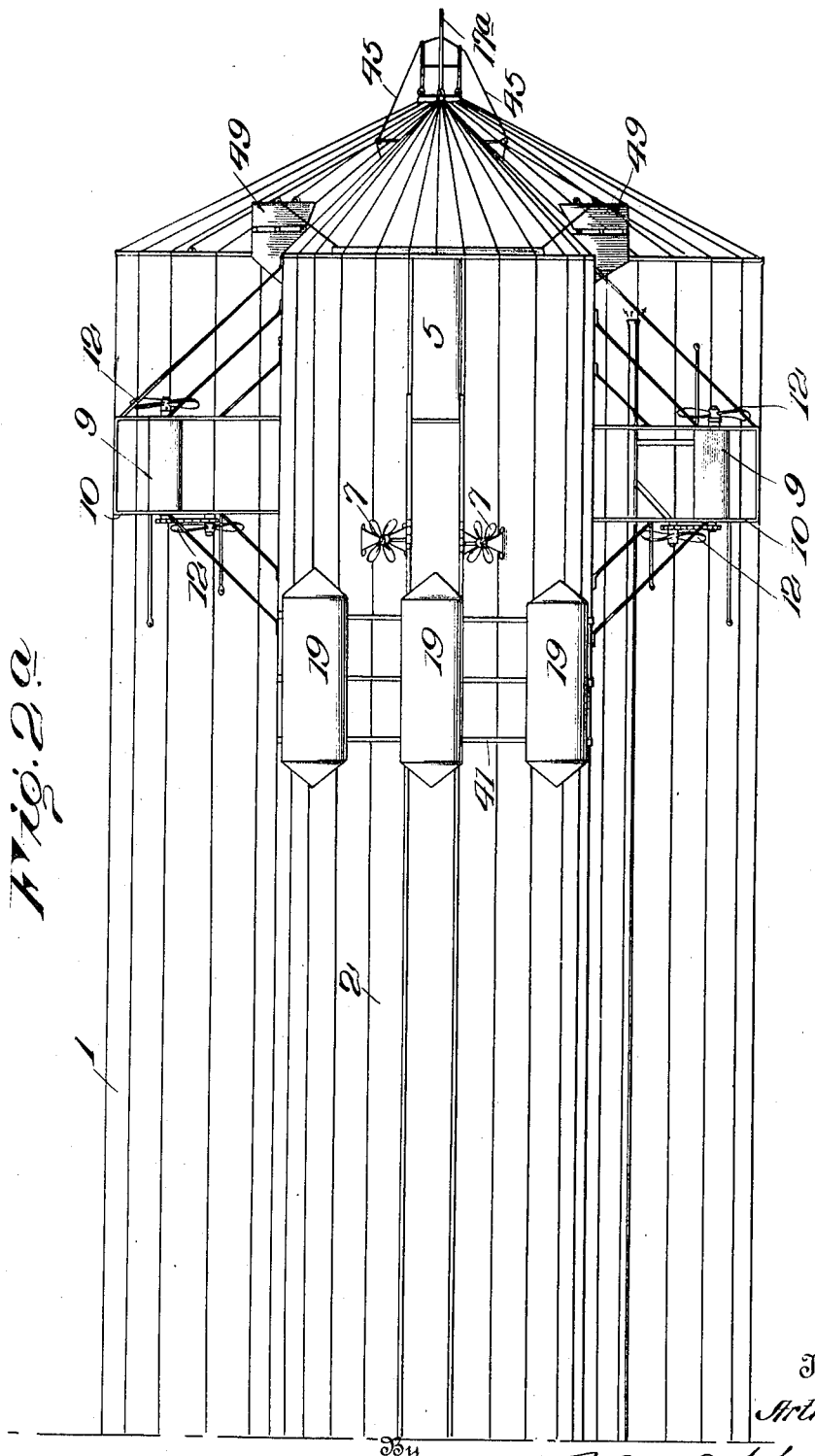

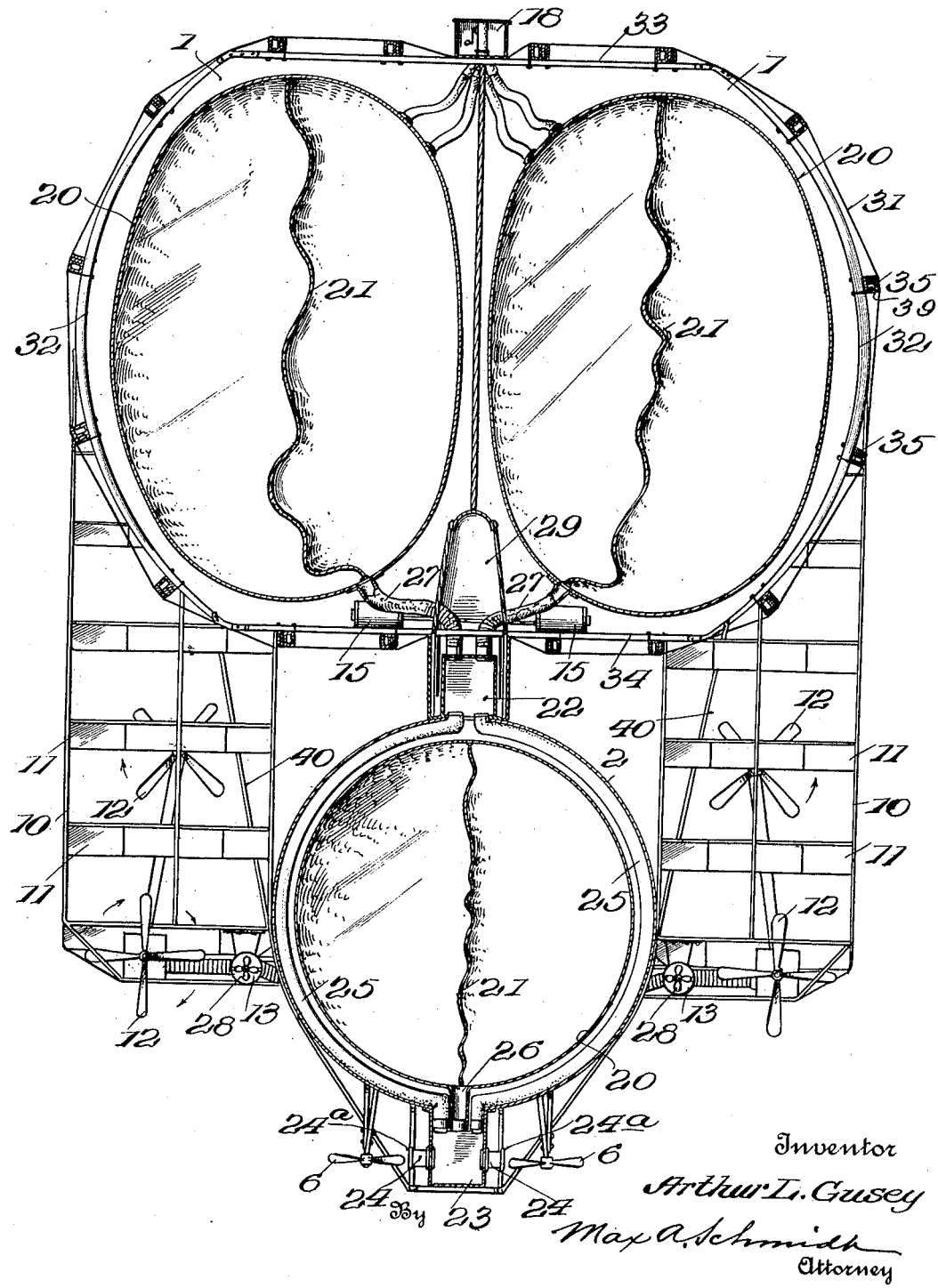

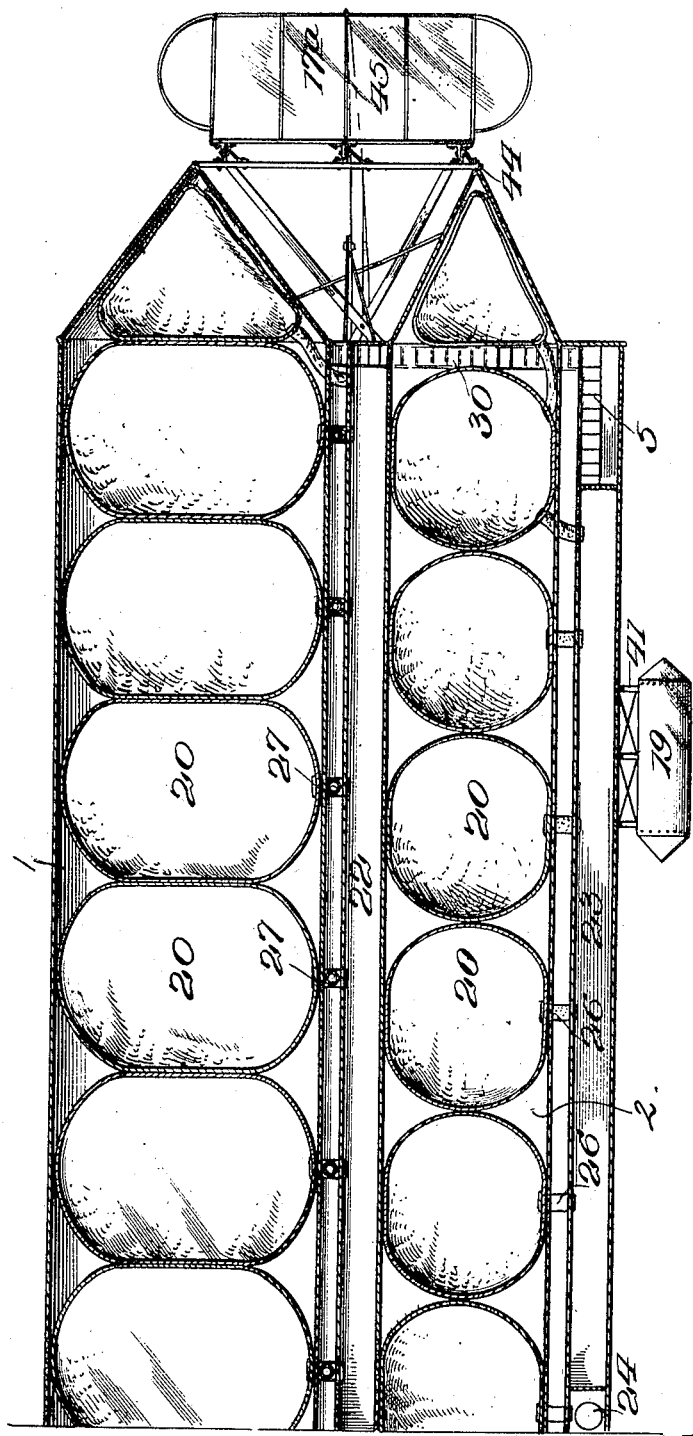

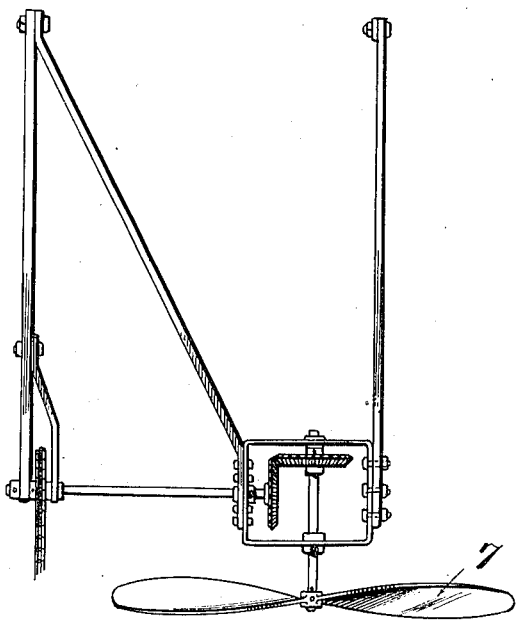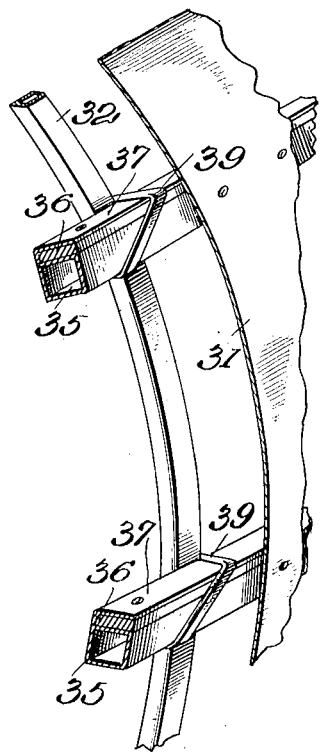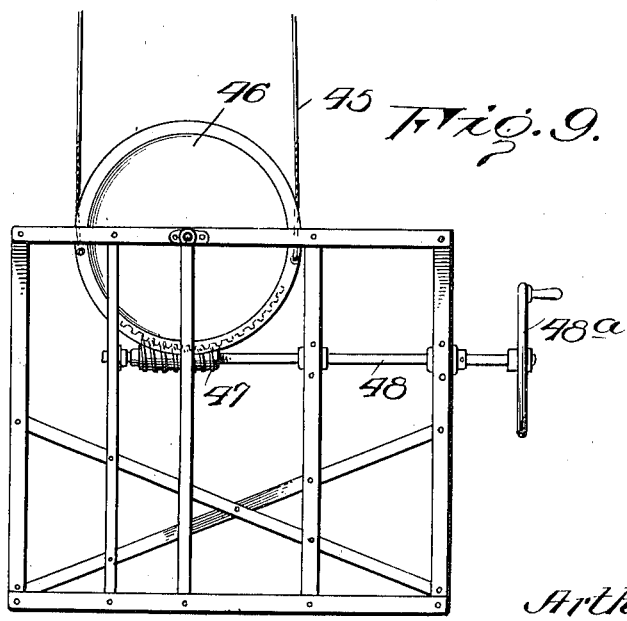

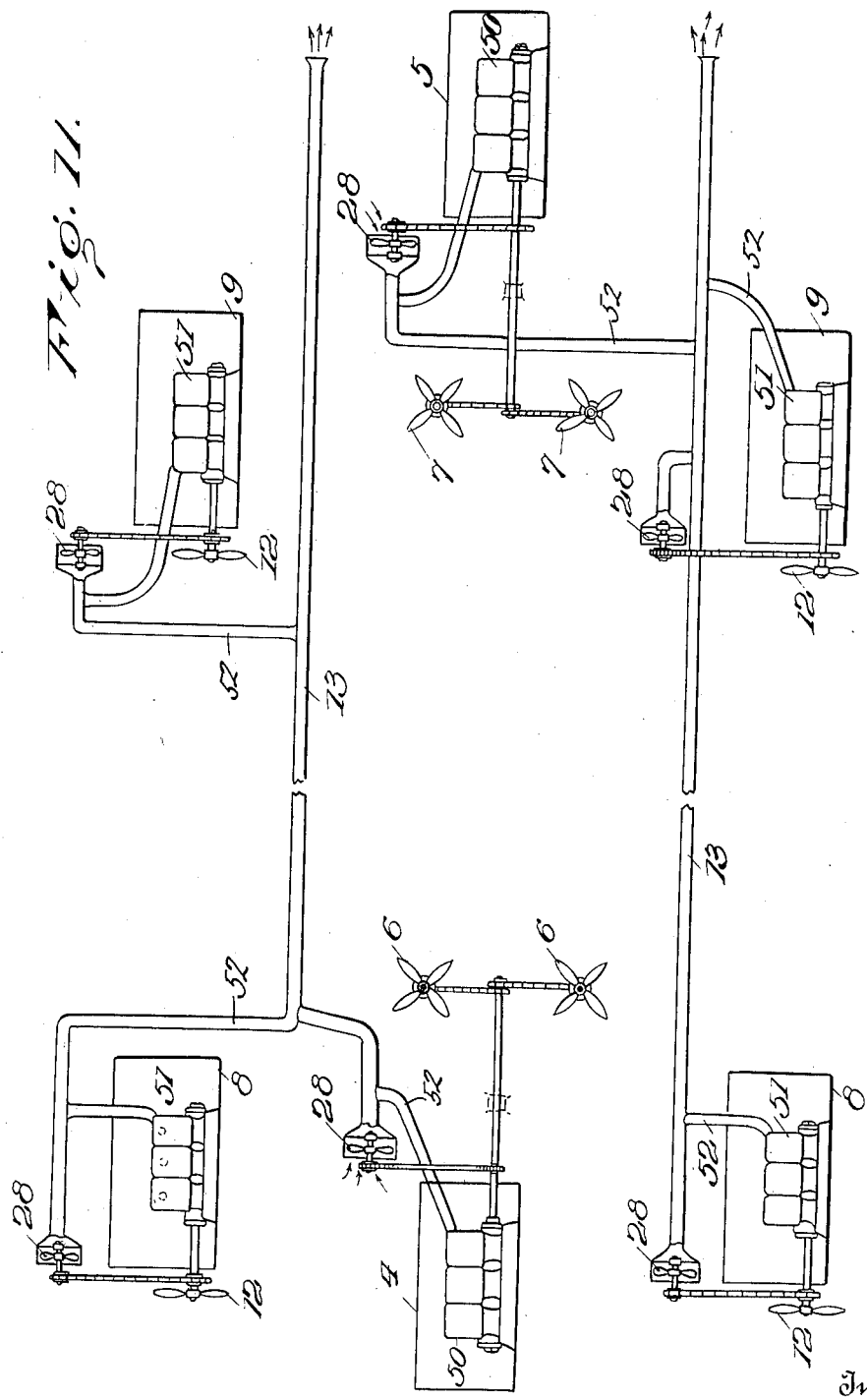

UNITED STATES PATENT OFFICE.

ARTHUR L. GUSEY, OF WALLA WALLA, WASHINGTON.

AERIAL VESSEL.

1,241,623.   Specification of Letters Patent.   Patented Oct. 2, 1917.

Application filed June 12, 1917. Serial No. 174,359.

*To all whom it may concern:*

Be it known that I, ARTHUR L. GUSEY, a citizen of the United States, residing at Walla Walla, in the county of Walla Walla and State of Washington, have invented certain new and useful Improvements in Aerial Vessels, of which the following is a specification.

This invention relates to air-craft of the heavier than air type, and its object is to provide a craft of this kind especially adapted and more particularly designed for warfare, and furthermore to provide a novel and improved construction and arrangement of balloons and other features as will be described in detail and claimed hereinafter.

In order that the invention may be better understood, reference is had to the accompanying drawings forming a part of this specification, and in said drawings—

Figure 1 is a side elevation of the forward half of the craft; Fig. 1$^a$ is a side elevation of the rear half thereof; Figs. 2 and 2$^a$ are inverted plan views of the structure shown in Figs. 1 and 1$^a$; Fig. 3 is an enlarged cross-section of the craft; Fig. 4 is a cross-section of a pontoon assembly; Fig. 5 is an elevation of a rudder assembly; Fig. 6 is a plan view of said rudder and a fragment of the craft by which it is carried; Fig. 7 is a longitudinal section of the forward half of the craft showing an arrangement of balloonets; Fig. 7$^a$ is a similar section through the rear half of the craft; Fig. 8 is an elevation of a propeller assembly; Fig. 9 is a plan view of a steering gear; Fig. 10 is a detail in perspective showing a frame structure, and Fig. 11 is a diagram showing a method of discharging the exhaust or spent gases of the engines which drive the propellers of the craft.

Referring specifically to the drawings, it will be seen that the ship is provided with a plurality of balloons or gas containers. Two top balloons 1 are provided, and one bottom balloon 2. The top balloons lie in the same horizontal plane and are spaced laterally, and the bottom balloon is located centrally with respect to the top balloons. The combined width of the top balloons is greater than the width of the bottom balloon. Between the top and bottom balloons, midway between the ends thereof, is located a housing 3 containing a suitable armament such as light rapid fire guns, bombs, etc. Below the bottom balloon, at the ends thereof, are cabins 4 and 5, respectively, containing heavy rapid fire guns, bombs, etc., and also the engines which operate elevating and depressing screws 6 and 7, respectively, located fore and aft and on both sides of the longitudinal center line of the machine. Main engine rooms 8 and 9 are located beneath and supported by frames 10 carrying elevating planes 11 located fore and aft and on both sides of the machine, below the top balloon structure and alongside the bottom one. Two double sets of screw propellers 12 are employed for propelling the machine, two pairs of propellers being located on each side, one fore and one aft. Extending fore and aft are exhaust tubes 13 which are suitably fastened to the frames 10. Front and rear gasolene or other liquid fuel supply pipes 14 for the engines conduct the fuel from main storage tanks 15 (shown in Fig. 3) to the engines, and auxiliary fuel supply pipes 16 lead to the engines which operate the screws 6 and 7.

At the ends of the machine are large rudders 17 and 17$^a$, respectively, controlling the direction thereof, and at the top of the machine is an anti-aircraft machine gun house 18. From the bottom of the machine are suspended pontoons 19 extending in front and rear rows across the machine and detachably connected thereto.

Each balloon is composed of an envelop or casing inclosing a plurality of balloonets 20 arranged in a row extending from the front to the rear of the casing and dimensioned to fill the same when inflated. Each balloonet is divided by a vertical partition 21 into two independent sections or compartments to prevent total loss of gas should one side become punctured, which, together with the employment of a large number of balloonets, permits the machine to remain aloft even though some of the balloonets should be punctured, and a very large number of balloonets would have to be punctured before the sustaining power of the balloons is destroyed.

The following means are provided for filling the balloonets 20:

Between the top and bottom balloons 1 and 2 is located a gas conduit 22, and below the bottom balloon is a main gas supply conduit 23. The conduit 23 is filled through inlet nipples 24, provided with suitable closures 24ª, and said conduit is connected by pipes 25 extending up and around, or between the bottom balloonets to the conduit 22. The bottom balloonets are filled from the conduit 23 by pipes 26, and the top balloonets are filled from the conduit 22 by pipes 27. A filler pipe is provided for each balloonet, and said pipe is connected to the balloonet to discharge on both sides of the partition 21 and fill both compartments.

The exhaust tubes or conduits 13 are connected to the engines and contain fans 28 which create suction from the engines, the exhaust fumes being carried to the rear of the machine and there discharged.

Between the two upper balloons 1 is constructed a passageway 29 extending longitudinally from the ends of the machine to the central housing 3. From the ends of this passageway ladders 30 lead to the end cabins 4 and 5.

The two top balloons are housed in a sheet metal casing 31 tapered at its ends. This casing is secured to a skeleton framework conforming to the shape of the casing. The framework consists of curved side bars 32 connected by top and bottom cross bars 33 and 34, respectively. To the side bars 32 are connected longitudinal bars 35. The bars 32 are made of metal tubing, and the bars 35 are also tubular, they being suitably secured to the bars 32. On the top faces of the bars 35 are secured wooden nailing strips 37 to prevent splitting when nails are driven thereinto, it being understood that the casing or sheath 31 is nailed to the outer edge of the strips 36. The joints in the casing or sheath can be made tight by soldering the same. A door will be provided so that access to the interior of the casing may be had. Ordinary U-bolts or clips 39 may be employed for fastening the bars 32 and 35 together.

The lower balloon 2 is carried by a skeleton frame constructed in the same manner as the top frame just described, the two frames being rigidly connected by braces 40 extending therebetween.

To the framework of the bottom balloon 2 are secured depending frames 41 supporting the pontoons 19 and braced by guy wires 42. All the parts of the framework of the machine will be properly guyed and braced as will be understood by those skilled in the art to which the invention appertains. The frame members 10 of the elevating planes 11 are suitably secured to the main framework at the sides of the machine adjacent to its ends.

The front rudder 17 is supported by a suitable framework 43, and a framework 44 supports the rear rudder 17ª. The rudders are controlled by cables 45 running to the same from a steering gear located in the front cabin 4. At suitable points the framework of the machine has guide pulleys for the steering cables.

The steering gear consists of a winding drum 46 for each cable, said drum being operated by a worm gearing 47, the worm shaft 48 being provided with a hand wheel 48ª.

The rudders 17 and 17ª control the lateral movement of the machine, and back of these rudders are rudders 49 for controlling the ascent and descent of the machine, these being operated by a steering gear similar to the one hereinbefore described and employed for controlling the rudders 17 and 17ª. Two rudders 49 are provided for each end of the machine, they being located at the sides thereof.

In the front and rear cabins 4 and 5 are located the engines or motors 50 which drive the screws 6 and 7. Internal-combustion engines may be employed, the shafts thereof being suitably geared to the shafts of the screws. The engines which drive the propeller screws 12 are located in the rooms or cabins 8 and 9. These may also be internal-combustion engines 51 having their shafts suitably geared to the propeller shafts. Each pair of propellers 12 is provided with an engine for driving the same, and the members of the respective pairs of propellers are suitably connected to the engine. The exhaust from the engine is carried by conduits 52 to the conduits 13, and the fans 28 are driven by the engines, they being geared thereto.

I claim:

1. In an aerial craft, superposed elongated balloon casings, the top casing being wider than the bottom casing and the latter being positioned centrally with respect to the former, a plurality of gas containers in the casings, a pair of gas conduits, a connection between said conduits, delivery pipes leading from one conduit and discharging into the gas containers of one casing, delivery pipes leading from the other conduit and discharging into the gas containers of the other casing, and a partition in each gas container dividing the same into separate compartments into which the respective delivery pipes discharge.

2. In an aerial craft, superposed elongated balloon structures, the top balloon structure being wider than the bottom one, and the latter being positioned centrally with respect to the former, and elevating planes fore and aft and on both sides of the craft, said planes being located below the top balloon structure and alongside the bottom balloon structure.

3. In an aerial craft, a balloon supported structure, propelling means, engines for driving the propelling means, exhaust conducting tubes leading from the engines and discharging to the rear of the craft, and fans associated with said tubes for forcing the exhaust gases therethrough.

4. In an aerial craft, a balloon casing comprising a frame consisting of side bars and longitudinal bars fastened thereto, the latter being on the outside, nailing strips carried by the upper sides of the longitudinal bars, and a sheathing secured to said strips and covering the frame.

In testimony whereof I affix my signature.

ARTHUR L. GUSEY.